Nov. 20, 1951 M. K. GOLDSTEIN 2,575,340
DETERMINATION OF GROUND CONSTANTS
Filed March 7, 1946 2 SHEETS—SHEET 2

Inventor
MAXWELL K. GOLDSTEIN

By M. A. Hayes

Attorney

UNITED STATES PATENT OFFICE 2,575,340

DETERMINATION OF GROUND CONSTANTS

Maxwell K. Goldstein, Washington, D. C.

Application March 7, 1946, Serial No. 652,748

3 Claims. (Cl. 250—3)

(Granted under the act of March 3, 1883, as amended April 30, 1928; 370 O. G. 757)

This invention relates to rapid determination of electrical characteristics of the earth's crust. More particularly, the invention relates to systems employing radio frequency energy for ascertaining electrical characteristics of the earth's crust over a large area.

Frequently it is necessary to determine electrical characteristics of the earth's crust over relatively large areas. Such a necessity would arise, for example, in the selection of a site for the antenna of a radio direction finding system. For optimum operation of such a system it is highly desirable, that a uniform ground plane be obtained. Previous methods of determining the characteristics of the earth's crust required considerable time for a thorough study about a particular location. In areas located near a coastline, the ebb and flow of the tide may cause considerable change in the average ground characteristics in short periods of time even though a homogeneous structure is retained. It is apparent that in such a situation the study must be made rapidly otherwise it will be impossible to obtain results that can be adequately correlated.

Accordingly it is an object of this invention to provide a method of rapidly determining electrical characteristics of the earth's crust over a large area.

Another object of this invention is to provide a method of determining electrical characteristics of the earth's crust employing radio frequency energy which is modulated in a known manner.

A still further object of this invention is to provide a system employing modulated radio frequency energy directed within the earth's crust for rapidly determining slight differences in electrical conductivity and other characteristics of the earth's crust over a relatively large area.

Other and further objects and features of the present invention will become apparent upon a careful consideration of the following detailed description when taken together with the accompanying drawings which illustrate typical embodiments of the invention and the manner in which these embodiments may be considered to operate.

In accordance with the fundamental concepts of the present invention, the characteristics of a selected area of the earth's crust can be determined with the aid of radio frequency energy having known varying characteristics. For the rapid determination of the ground characteristics in a selected area, radio frequency energy bearing modulation possessing known characteristics is delivered into the earth's crust at a selected point therein. This selected point is preferably located at the center of the selected area. The modulated radio frequency energy delivered into the earth's crust is received after propagation through known portions of the earth's crust in the selected area. Determination of the propagational characteristics of the material comprising the earth's crust in the selected area is then possible by ascertaining any changes produced in the modulation signal as a result of the passage of the radio frequency energy through the earth's crust.

The echo technique may be employed but is best suited to pulse type modulation of the energy from source 22; however, continuous emission of a frequency modulated signal may be employed if separate emitting and receiving elements are supplied in the antenna system with adequate shielding between each.

Figure 1:
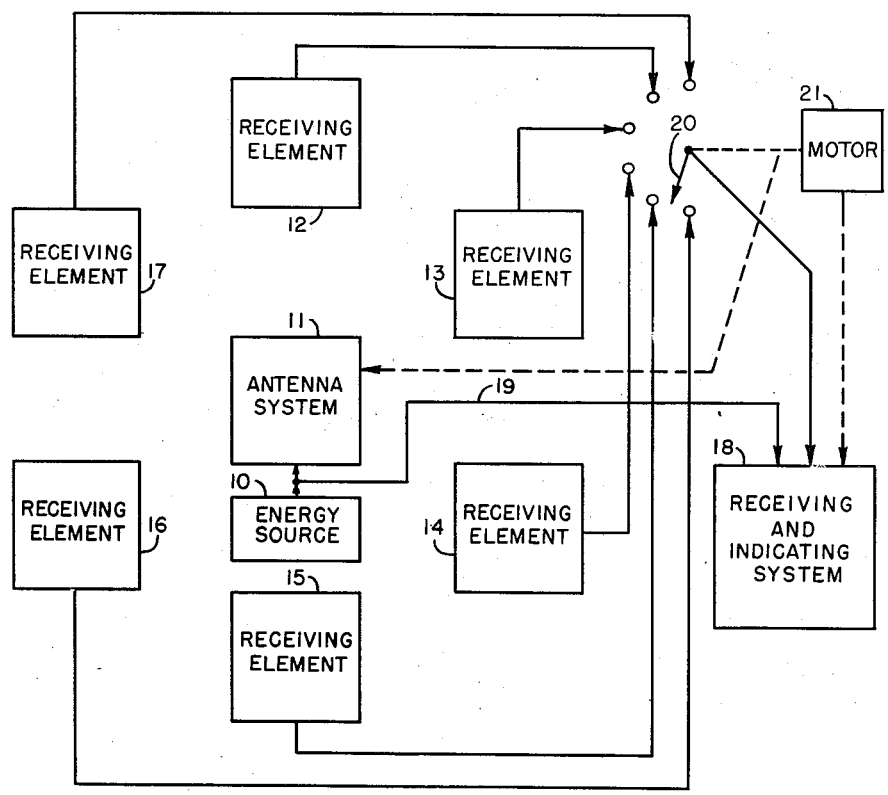
Figure 1 is a block diagram showing one embodiment of the features of the present invention.

The resistivity and dielectric constant of the material comprising the earth's crust in the selected area may be determined with this apparatus. These electrical characteristics, as those of any propagating medium are dependent upon the velocity of propagation and the frequency of the propagated wave. Thus by determining the propagation characteristics of the earth's crust for several frequencies in accordance with the concepts of this invention the resistivity and dielectric constant of the surrounding area may readily be calculated. To simplify these calculations it is generally desirable to have information regarding the performance of the apparatus upon a section of the earth's crust having known characteristics. With reference to Figure 1, one embodiment of the features of the present invention is shown as applied to one way transmission of radio frequency electrical energy within the earth's crust.

A source of radio frequency energy 10 is employed to produce signals having modulation of a known character such as pulse or frequency modulation. The energy source 10 may be a radio frequency signal generator preferably adapted for the specific type of modulation selected. A signal emitting device or radiating element 11, is placed in a hole drilled in the earth's crust to a depth permitting the energy to be radiated in the plane the study of which is desired. Element 11 is insulated from direct contact with the ground and oriented to produce the most effective transfer of energy to the earth's crust. Horizontal polarization is usually preferred because improved propagation is obtained from the antenna. Energy receiving elements 12, 13, 14, 15, 16, and 17 are embedded in the ground radially about the radiating element 11 and preferably equidistant therefrom. Each of the receiving elements is adapted to receive part of the energy emitted by element 11 after propagation through a selected path in the earth's crust. For optimum operation it is preferable that the radiating element 11 as well as each of the receiving elements be resonant at the average radio frequency employed and that they be insulated from direct contact with the earth.

Energy intercepted by the receiving elements numbered 12 through 17 is supplied on a time sharing basis to a receiving and indicating system 18. Time sharing is effected by a switch 20 driven by motor 21 and adapted to apply the output of each receiving element sequentially to the receiver indicator system 18. The receiver indicator 18 may be of suitable design to permit a rapid determination of the difference in modulation characteristics between the emitted energy and receiving energy. For this purpose a part of the emitted energy is supplied to the receiver indicator unit 18 by means of a direct transmission path 19. Where pulse modulation of the energy emitted by the radiating element 11 is employed it is preferable that the receiver indicator system 18 be adapted to determine the time delay produced in the propagation of energy from the radiating element to each of the receiving elements. This time delay may conveniently be measured by determining the time elapsing between the generation of a pulse of energy by source 10 and the deliverance of a part of that energy to the receiver indicator 18 after interception by one of the receiver elements, suitable allowance being made for any difference in length of path from the individual receiving elements to the switch 20. Where all of the receiving elements are located equidistant from the radiating element 11 the time of passage through the earth's crust to each receiving element should be equal for a homogeneous earth structure. Should any discontinuity be present in the crust, the time of passage to all receiving elements will not be equal. For accuracy of results it is desirable that the time delay produced in the transmission path from each of the receiving elements numbered 12 through 17 through switch 20 and to the receiver indicator system 18 be equal.

Where the energy emitted by source 10 is frequency modulated, the receiver indicator system 18 must be adapted to measure the frequency difference between the emitted frequency modulated signal and the signal received by the receiving elements 12 through 17. To this end a frequency difference determining network such as commonly employed in radio operating altimeters would normally be included in the receiving indicating system 18. A typical frequency difference determining apparatus is disclosed in U. S. Patent 2,206,896, issued July 9, 1940 to William H. C. Higgins and Russel C. Newhouse, for a Radiant Energy Distance Measuring System.

In general the frequency modulation type signal is preferable where it is desirable to investigate the characteristics of the earth's crust immediately surrounding the radiating element 11. Pulse modulation of the energy from source 10 is preferable where investigation of a large surrounding area is desired. For investigation out to extreme ranges a directive radiating element 11 may be employed in which case the direction of maximum field intensity therefrom would be varied in synchronism with the operation of switch 20 by means of linkage to motor 21, so that it is always in the direction of the receiving element which is connected to the receiving indicating system 18. At extreme ranges it may be desirable that a part of the transmission path from each receiving element to the switch 20 include radio frequency transmission by induction or radiation through the earth's atmosphere.

Figure 2:
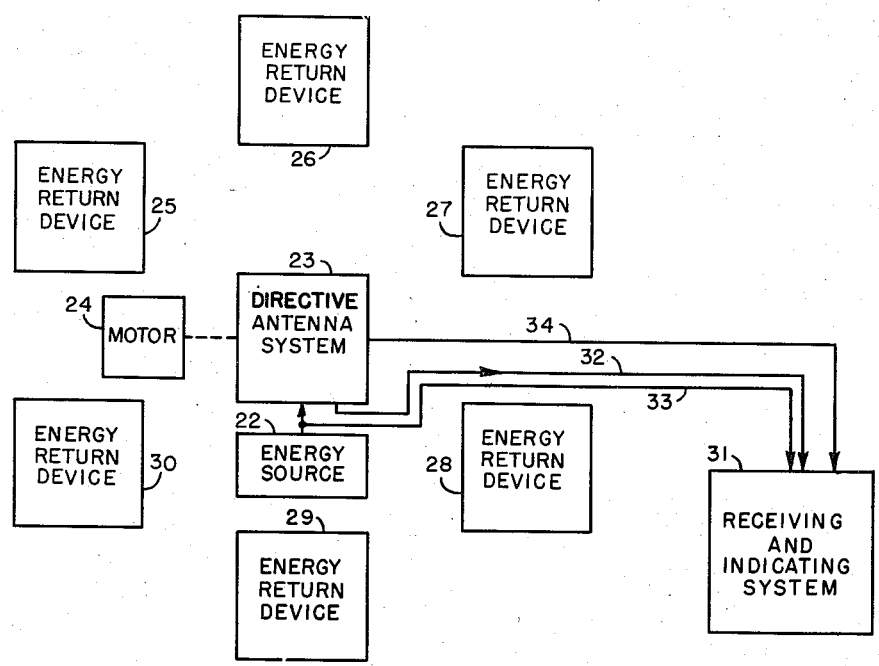
Figure 2 is a block diagram showing an alternate embodiment of the features of the present invention.

With reference now to Fig. 2, a variation of the basic apparatus is shown in which the pulse echo technique is employed. Modulated energy from the energy source 22 is applied to an antenna system 23 possessing directive characteristics. The antenna system 23 is constructed so that the direction of maximum field intensity may be altered by a motor 24. Energy emitted by the antenna system 23 travels outward through the earth's crust to a distant point at which a portion of it may be intercepted by the energy radiating devices numbered 25 through 30. Energy intercepted by one of the energy radiating devices 25 through 30 is reflected back through the earth's crust to the antenna system 23. The energy return devices 25 through 30 may comprise simply resonant antenna elements for absorbing and re-emitting energy originally produced by source 22 or may include a signal generator adapted to initiate the production of energy upon receipt of a signal from the antenna system 23. Energy from the energy return devices 25 through 30 is intercepted by the antenna system 23 and delivered to the receiving and indicating system 31 by means of a transmission path 32. A portion of the generated energy is also supplied to the receiving and indicating system 31 through a second transmission path 33. In a manner as previously described, the receiving and indicating system can be employed to determine any difference in modulation characteristics between the emitted and the received signal. An auxiliary information transmission path 34 is provided with connection between the antenna system 23 and the receiving and indicating system 31 so that the direction of maximum intensity of the signal emitted by the antenna 23 may be indicated.

From the foregoing discussion it is apparent that considerable modification of the features of this invention are possible and while the devices herein described and the forms of apparatus for the operation thereof constitute preferred embodiments of the invention, it is to be understood that the invention is not limited to these precise devices and forms of apparatus, and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. An apparatus for determining electrical characteristics of the earth's crust, comprising; means generating frequency modulated radio frequency energy, an antenna system operative to deliver the radio frequency energy thus generated to the earth's crust, a plurality of receiving elements located at various points in the earth's crust equidistant from said antenna system operative to receive part of the generated energy primarily after direct propagation through selected portions of the earth's crust, a receiving system responsive to the frequency differences between the transmitted and received signals for amplifying the received signals, switching means for connecting individually and sequentially each of said receiving elements to said receiving system, and indicator means operable from the output of said receiving system for indicating the relative rate of energy propagation through each of the selected portions of the earth's crust.

2. An apparatus for determining electrical characteristics of the earth's crust, comprising; generator means for producing pulses of radio frequency electrical energy, an antenna system located below the surface of the earth for delivering said radio frequency energy into the earth's crust at a selected locality thereof, a plurality of receiving elements located in the earth's crust at selected points equidistant from said antenna system for intercepting part of said radio frequency energy after direct propagation thereof through the earth's crust, a receiving system for amplifying the intercepted radio frequency energy, switching means for individually and sequentially connecting each of said receiving elements to said receiving system, and indicator means for determining elapsed time between the generation of a particular pulse and the reception of a part of that pulse energy by a receiving antenna.

3. An apparatus for determining electrical characteristics of the earth's crust comprising; generator means for producing pulses of radio frequency electrical energy, a rotatable directive antenna system placed below the surface of the earth for delivering said radio frequency energy into the earth's crust in known directions at a selected locality thereof, means supplying the radio frequency energy from said generator means to said directive antenna system, a plurality of energy return means located in the earth's crust at points equidistant from said directive antenna system operative to initiate a return signal upon receipt of radio frequency energy from said directive antenna system, receiving means for amplifying return energy, coupling means connecting said receiving means to said directive antenna system for supplying return energy to the receiving means, and an elapsed time indicator for determining the time interval between the generation of a pulse of electrical energy and the interception of return energy from said energy return means.

MAXWELL K. GOLDSTEIN.

REFERENCES CITED

The following references are of record in the file of this patent:

UNITED STATES PATENTS

| Number | Name | Date |
|---|---|---|
| 2,077,707 | Melton | Apr. 20, 1937 |
| 2,134,716 | Gunn | Nov. 1, 1938 |
| 2,139,460 | Potapenko | Dec. 6, 1938 |
| 2,172,778 | Taylor | Sept. 12, 1939 |
| 2,317,259 | Doll | Apr. 20, 1943 |
| 2,364,209 | Green | Dec. 5, 1944 |
| 2,389,432 | Hansell | Nov. 20, 1945 |
| 2,405,239 | Seeley | Aug. 6, 1946 |
| 2,408,048 | Deloraine et al. | Sept. 24, 1946 |